United States Patent
Tang

(10) Patent No.: US 11,399,391 B2
(45) Date of Patent: Jul. 26, 2022

(54) METHOD AND DEVICE TO PROVIDE A SIGNAL TRANSMISSION BETWEEN A SENDING NODE AND RECEIVING NODE IN UNLICENSED FREQUENCY BAND

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 40 days.

(21) Appl. No.: 16/993,186

(22) Filed: Aug. 13, 2020

(65) Prior Publication Data
US 2020/0374931 A1 Nov. 26, 2020

Related U.S. Application Data

(63) Continuation of application No. PCT/CN2018/076901, filed on Feb. 14, 2018.

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 74/0816; H04W 74/0825; H04W 72/046; H04W 72/04; H04W 72/12
See application file for complete search history.

(56) References Cited

U.S. PATENT DOCUMENTS

| | | | |
|---|---|---|---|
| 9,479,240 B1* | 10/2016 | Caire | H04B 7/0626 |
| 2004/0038695 A1* | 2/2004 | Sharony | H04W 72/046 |
| | | | 455/517 |
| 2010/0182987 A1 | 7/2010 | Shin | |
| 2011/0305162 A1 | 12/2011 | Morioka | |
| 2012/0020420 A1* | 1/2012 | Sakoda | H01Q 3/26 |
| | | | 375/259 |
| 2017/0331577 A1* | 11/2017 | Parkvall | H04W 4/00 |
| 2017/0331670 A1* | 11/2017 | Parkvall | H04W 52/028 |
| 2020/0296635 A1* | 9/2020 | Rastegardoost | H04L 5/0048 |

(Continued)

FOREIGN PATENT DOCUMENTS

| | | | |
|---|---|---|---|
| CN | 02404082 | * | 4/2012 |
| CN | 102404082 A | | 4/2012 |

OTHER PUBLICATIONS

Supplementary European Search Report in the European application No. 18906646.7, dated Dec. 21, 2020.

(Continued)

*Primary Examiner* — Mewale A Ambaye
(74) *Attorney, Agent, or Firm* — Ladas & Parry, LLP

(57) ABSTRACT

Provided are a signal transmission method and device. The method includes that: a sending node sends a request-to-send (RTS) signal to a receiving node, the RTS signal including configuration information configured to transmit a clear-to-send (CTS) signal; and the sending node receives the CTS signal sent by the receiving node according to the configuration information.

15 Claims, 3 Drawing Sheets

(56) References Cited

U.S. PATENT DOCUMENTS

2020/0396744 A1* 12/2020 Xiong ............... H04W 72/0446

OTHER PUBLICATIONS

English translation of the Written Opinion of the International Search Authority in the international application No. PCT/CN2018/076901, dated Nov. 20, 2018.
Mediatek Inc. "Considerations on NR Unlicensed Channel Access, R1-1719567" 3GPP TSG RAN WG1 Meeting 91, 01, Nov. 27-Dec. 2017 (Dec. 1, 2017), entire document.
Samsung, "Channel Access for NR Unlicensed Operation, R1-1800478" 3GPP TSG-RAN WG1 Meeting #AH1801, Jan. 22-26, 2018 (Jan. 26, 2018), entire document.
Interdigital Inc. "On Coexistence and Channel Access for NR-Unlicensed, R1-1800638" 3GPP TSG RAN WG1 Meeting AH1801, Jan. 22-26, 2018 (Jan. 26, 2018), entire document.
International Search Report in the international application No. PCT/CN2018/076901, dated Nov. 20, 2018.
Written Opinion in the international application No. PCT/CN2018/076901, dated Nov. 20, 2018.

* cited by examiner

METHOD AND DEVICE TO PROVIDE A SIGNAL TRANSMISSION BETWEEN A SENDING NODE AND RECEIVING NODE IN UNLICENSED FREQUENCY BAND

CROSS-REFERENCE TO RELATED APPLICATION

This application is a continuation of International Patent Application No. PCT/CN2018/076901 filed on Feb. 14, 2018, the disclosure of which is incorporated herein by reference for all purposes.

TECHNICAL FIELD

Embodiments of the disclosure relate to the field of communication, and more particularly to a signal transmission method and device.

BACKGROUND

Data transmission in an unlicensed frequency band is supported in a 5th-Generation (5G) system. A sending node may send a sending signal to a receiving node to request for communication with the receiving node. The receiving node may return a signal to the sending node to indicate that the sending node may transmit data to the receiving node. The sending node may transmit the data to the receiving node only when receiving the signal returned by the receiving node. Therefore, how to improve efficiency of signal transmission between a sending node and a receiving node in an unlicensed frequency band becomes a problem urgent to be solved.

SUMMARY

The embodiments of the disclosure provide a signal transmission method and device, which may improve efficiency of signal transmission between a sending node and receiving node in an unlicensed frequency band.

A first aspect provides a method for signal transmission, which may include that: a sending node sends a request-to-send (RTS) signal to a receiving node, the RTS signal including configuration information configured to transmit a clear-to-send (CTS) signal; and the sending node receives the CTS signal from the receiving node, the CTS signal being sent by the receiving node according to the configuration information.

A second aspect provides a method for signal transmission, which may include that: a receiving node receives an RTS signal from a sending node, the RTS signal including configuration information configured to transmit a CTS signal; and the receiving node sends the CTS signal to the sending node according to the configuration information.

A third aspect provides a sending node, which may execute operations of the sending node in the first aspect or any optional implementation mode of the first aspect. Specifically, the sending node may include modular units configured to execute the operations of the sending node in the first aspect or any possible implementation mode of the first aspect.

A fourth aspect provides a receiving node, which may execute operations of the receiving node in the first aspect or any optional implementation mode of the first aspect. Specifically, the receiving node may include modular units configured to execute the operations of the receiving node in the second aspect or any possible implementation mode of the second aspect.

A fifth aspect provides a sending node, which includes a processor, a transceiver and a memory. The processor, the transceiver and the memory can communicate with one another through an internal connecting path. The memory is configured to store instructions, and the processor is configured to execute the instructions stored in the memory. When the processor executes the instructions stored in the memory, such execution enables the sending node to execute the method in the first aspect or any possible implementation mode of the first aspect, or such execution enables the sending node to implement the sending node provided in the third aspect.

A sixth aspect provides a receiving node, which includes a processor, a transceiver and a memory. The processor, the transceiver and the memory can communicate with one another through an internal connecting path. The memory is configured to store instructions, and the processor is configured to execute the instructions stored in the memory. When the processor executes the instructions stored in the memory, such execution enables the receiving node to execute the method in the second aspect or any possible implementation mode of the second aspect, or such execution enables the receiving node to implement the receiving node provided in the fourth aspect.

A seventh aspect provides a system chip, which includes an input interface, an output interface, a processor and a memory. The processor is configured to execute instructions stored in the memory. When the instructions are executed, the processor may implement the method in the first aspect or any possible implementation mode of the first aspect.

An eighth aspect provides a system chip, which includes an input interface, an output interface, a processor and a memory. The processor is configured to execute instructions stored in the memory. When the instructions are executed, the processor may implement the method in the second aspect or any possible implementation mode of the second aspect.

A ninth aspect provides a computer program product including instructions, which is run in a computer to enable the computer to execute the method in the first aspect or any possible implementation mode of the first aspect.

A tenth aspect provides a computer program product including instructions, which is run in a computer to enable the computer to execute the method in the second aspect or any possible implementation mode of the second aspect.

DETAILED DESCRIPTION

The technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5G system.

Figure 1:
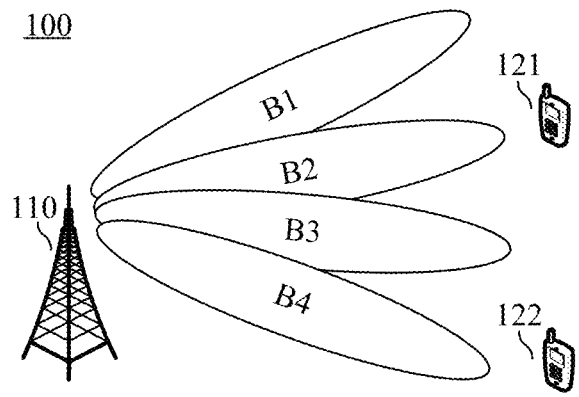
FIG. 1 is a schematic diagram of a wireless communication system to which the embodiments of the disclosure are applied.

FIG. 1 illustrates a wireless communication system 100 to which the embodiments of the disclosure are applied. The wireless communication system 100 may include a network device 110. The network device 110 may be a device for communicating with a terminal device. The network device 110 may provide communication coverage for a specific geographical region and may communicate with a terminal device (for example, user equipment (UE)) in the coverage. Optionally, the network device 110 may be a base transceiver station (BTS) in the GSM or the CDMA system, or may be a nodeB (NB) in the WCDMA system, or may be an evolutional node B (eNB or eNodeB) in the LTE system or a wireless controller in a cloud radio access network (CRAN). Or the network device may be a relay station, an access point, a vehicle device, a wearable device, a network-side device in a future 5G network, a network device in a future evolved Public Land Mobile Network (PLMN) or the like.

The wireless communication system 100 may further include at least one terminal device, for example, a terminal device 121 and a terminal device 122, within the coverage of the network device 110. The terminal device 121 and the terminal device 122 may be mobile or fixed. Optionally, the terminal device 121 or the terminal device 122 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle device, a wearable device, a terminal device in the future 5G network, a terminal device in the future evolved PLMN or the like. Optionally, the terminal device 121 and the terminal device 122 may perform Device to Device (D2D) communication.

One network device and two terminal devices are exemplarily shown in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as a network controller and a mobility management entity. There are no limits made thereto in the embodiments of the disclosure.

Since a frequency band for data transmission in a 5G system is higher than a frequency band for LTE, path loss for wireless signal transmission may increase and coverage of a wireless signal may decrease. To this end, a beamforming technology is proposed in the 5G system to increase the gain of a wireless signal, thereby making up for the path loss. Specifically, a beam configured by a BTS to send a signal to a terminal device has directivity. Different beams actually correspond to different transmission directions. Each narrow beam can only cover part of a cell area rather than all areas in the cell. For example, FIG. 1 shows four beams in different directions, that is, beam B1, beam B2, beam B3 and beam B4. The BTS may transmit signals to the terminal device through the four beams in different directions. Beam B1 and beam B2 can cover the terminal device 121 instead of the terminal device 122. Beam B3 and beam B4 can cover the terminal device 122 instead of the terminal device 121. The BTS may send a signal to the terminal device 121 through beam B1 and beam B2, and send a signal to the terminal device 122 through beam B3 and beam B4.

A Listen Before Talk (LBT) mechanism in unlicensed frequency bands and an RTS/CTS mechanism in a Wireless Fidelity (WiFi) mechanism working in unlicensed frequency bands, involved in the embodiments of the disclosure, will be briefly introduced below.

A 5G system supports data transmission in unlicensed frequency bands. Data transmission in an unlicensed frequency band is based on the LBT mechanism, namely a sending node, before sending data, needs to sense whether a channel is idle or not and can send the data only after determining that the channel is idle.

In addition, for the WiFi mechanism working in unlicensed frequency bands, for solving the problem on hidden nodes, the RTS/CTS mechanism is proposed. Hidden stations mean that BTS A sends a signal to BTS B, and BTS C may also send a signal to BTS B when BTS A is not detected. Therefore, BTS A and BTS C can simultaneously send signals to BTS B, causing signal collision, which may eventually cause the signals sent to BTS B to be lost. This problem can be solved through the RTS/CTS mechanism. During the use of RTS/CTS, if an upper limit of the number of bytes to be transmitted is set, then once data to be transmitted is greater than the upper limit, an RTS/CTS handshake protocol may be started. First, BTS A may send an RTS signal to BTS B, indicating that BTS A is to send some data to BTS B. BTS B may send a CTS signal after receiving the RTS signal, indicating that BTS B is ready and BTS A may send data. The rest BTSs that are to send data to BTS B can suspend sending data to BTS B. In this way, real data transfer can start only after the two parties successfully exchange the RTS/CTS signals (that is, the handshake is completed), which ensures that when multiple invisible sending nodes send signals to the same receiving node at the same time, only the node that receives the CTS signal returned by the receiving node can transmit data to the receiving node, thereby avoiding conflicts.

Since a sending node can transmit data to a receiving node only when receiving a CTS signal returned by the receiving node, how to improve efficiency of signal transmission between the sending node and the receiving node becomes a problem urgent to be solved.

In the embodiments of the disclosure, a sending node, when sending an RTS signal to a receiving node, may carry configuration information for transmission of a CTS signal to enable the receiving node to send the CTS signal to the sending node based on the configuration information, and the sending node may detect the CTS signal based on the configuration information, so that efficiency of signal transmission between the sending node and the receiving node is improved.

It is to be understood that, in the embodiments of the disclosure, a beam for receiving a signal may be understood as a spatial domain reception filter for receiving the signal; and a beam for sending a signal may be understood as a spatial domain transmission filter for sending the signal. For two signals sent by the same spatial domain transmission filter, it can be understood that the two signals are quasi-co-located (QCL) relative to a spatial receiving parameter.

Figure 2:
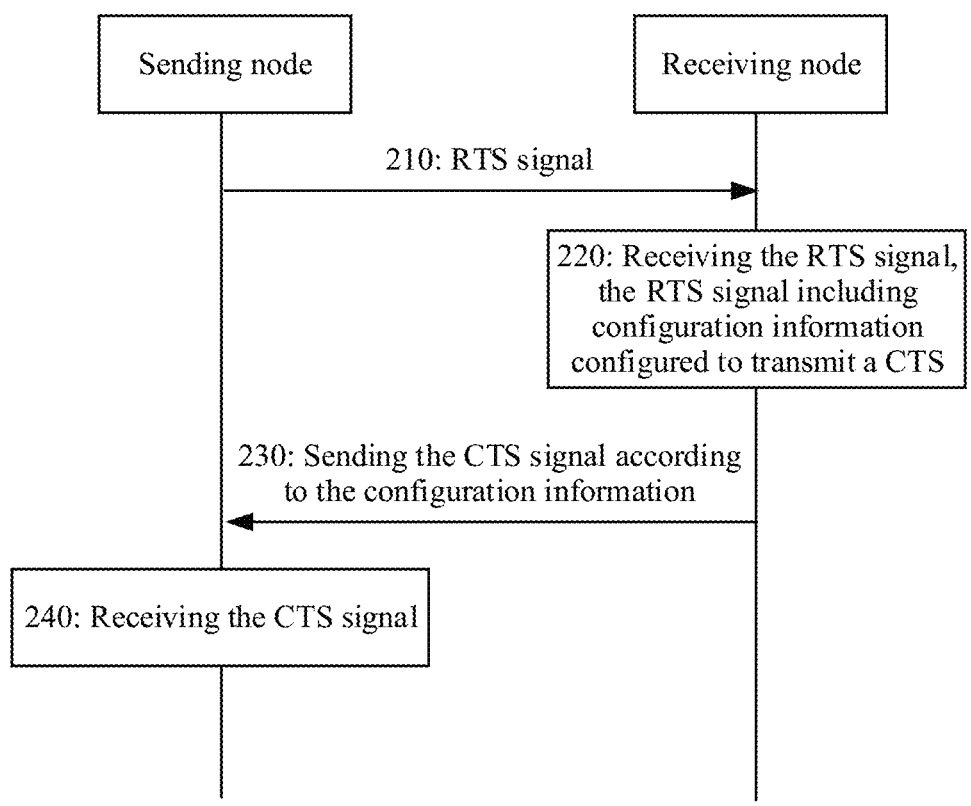
FIG. 2 is an interaction flowchart of a signal transmission method according to an embodiment of the disclosure.

FIG. 2 is an interaction flowchart of a signal transmission method according to an embodiment of the disclosure. A sending node and receiving node shown in FIG. 2 may be, for example, the network device 110 and terminal device 121 or terminal device 122 shown in FIG. 1. The method shown in FIG. 2 may be applied to, for example, an unlicensed frequency band. As shown in FIG. 2, the signal transmission method may include part or all of the following contents.

In 210, the sending node sends an RTS signal to the receiving node.

In 220, the receiving node receives the RTS signal from the sending node.

The RTS signal may include configuration information configured to transmit a CTS signal.

Optionally, the RTS signal may be at least configured to request for data transmission between the sending node and the receiving node. For example, the RTS signal may include an address of the receiving node, time of a data frame and sending time of an acknowledgement (ACK). The RTS signal may further include another content or have another function. There are no limits made herein.

Optionally, the CTS signal may be at least configured to indicate permission of the data transmission between the sending node and the receiving node, or, further indicate that another node is forbidden from performing data transmission between the sending node and the receiving node. The CTS signal may further include another content or have another function. There are no limits made herein. Particularly, in a WiFi system, the sending request signal is an RTS signal, and the sending permission signal is a CTS signal.

Optionally, the configuration information may include indication information of each of N candidate beams and/or information of sending time, corresponding to each of the N candidate beams, of the CTS signal, N being a positive integer.

The indication information of each of the N candidate beams may include, for example, a signal index of a reference signal having a QCL relationship with each candidate beam.

The sending time, corresponding to each of the N candidate beams, of the CTS signal may include, for example, time occupied when the CTS signal is hypothesized to be sent through each of the N candidate beams.

The N pieces of sending time, corresponding to the N candidate beams, of the CTS signal may overlap or not overlap. The two conditions will be described below respectively.

Condition 1

Optionally, the N pieces of sending time, corresponding to the N candidate beams, of the CTS signal do not overlap with each other.

A time interval between sending time, corresponding to a first candidate beam, of the CTS signal and sending time of the RTS signal is T1. A time interval between sending time, corresponding to an ith candidate beam, of the CTS signal and sending time, corresponding to an (i+1)th candidate beam, of the CTS signal is $T_i$. A time interval between sending time, corresponding to an (i+1)th candidate beam, of the CTS signal and sending time, corresponding to an (i+2)th candidate beam, of the CTS signal is $T_{i+1}$.

$T_i = T_{i+1}$ or $T_i \neq T_{i+1}$, and $i$ is 1 to $N-2$.

Figure 3:
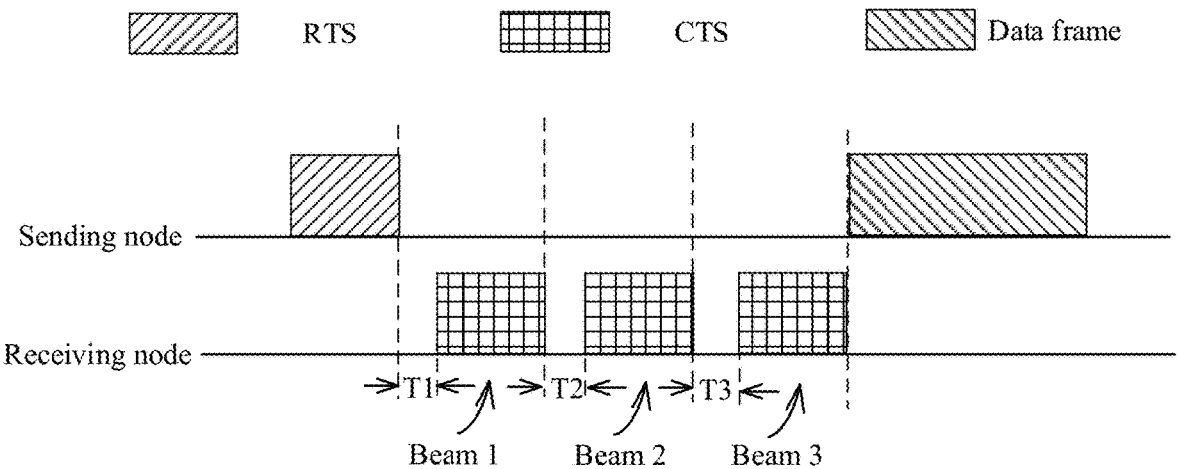
FIG. 3 is a schematic diagram of sending time of a CTS signal according to an embodiment of the disclosure.

For example, as shown in FIG. 3, there is made such a hypothesis that N=3. The three candidate beams are beam 1, beam 2 and beam 3. A time interval between the sending time, corresponding to the beam 1, of the CTS and the sending time of the RTS signal is T1, a time interval between the sending time, corresponding to the beam 2, of the CTS signal and the sending time, corresponding to the beam 1, of the CTS is T2, and a time interval between the sending time, corresponding to the beam 3, of the CTS signal and the sending time, corresponding to the beam 2, of the CTS signal is T3. T1 may be, for example, 16 us or 25 us. T2 and T3 may be equal or unequal.

Condition 2

Optionally, the N pieces of sending time, corresponding to the N candidate beams, of the CTS signal overlap, and a time interval between the overlapping sending time of the CTS signal and the sending time of the RTS signal is T1.

Figure 4:
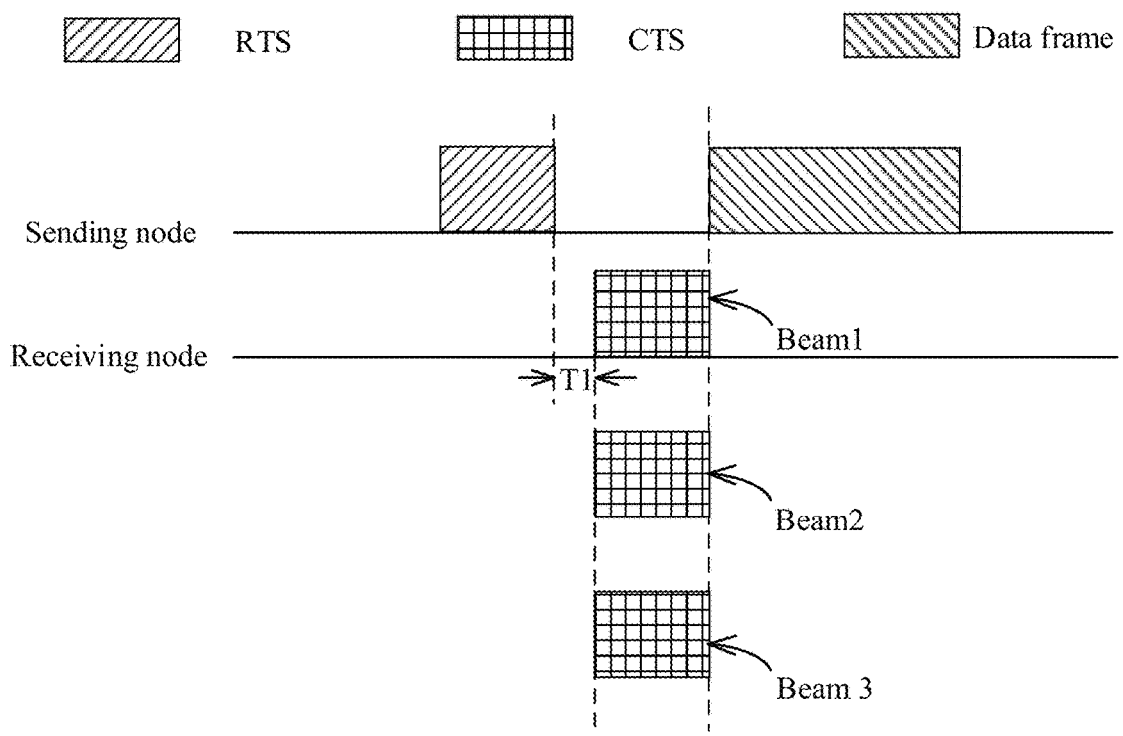
FIG. 4 is a schematic diagram of sending time of a CTS signal according to an embodiment of the disclosure.

For example, as shown in FIG. 4, there is made such a hypothesis that N=3. The three candidate beams are beam 1, beam 2 and beam 3. The three pieces of sending time, corresponding to the beam 1, the beam 2 and the beam 3, of the CTS signal are the same, and a time interval between it and the sending time of the RTS signal is T1. T1 may be, for example, 16 us or 25 us.

Optionally, in the condition 1, the receiving node can only use one beam for sending and receiving at the same time. While in the condition 2, the receiving node can use multiple beams for sending and receiving at the same time.

In 230, the receiving node sends a CTS signal to the sending node according to the configuration information.

Optionally, the receiving node may select a target beam from the N candidate beams according to a measurement result obtained by performing signal measurement on a reference signal and/or a sensing result obtained by performing carrier sensing (or called beam sensing, channel sensing and sensing, etc.) on the beams, thereby sending the CTS signal to the sending node through the target beam.

The target beam may be, for example, a beam with a channel sensed to be idle among the N candidate beams, or a beam with an optimal reference signal measurement result among the N candidate beams or a beam with an optimal reference signal measurement result among beams with channels sensed to be idle.

That a terminal device senses that a channel is idle in a certain beam may refer to that, for example, power of a reference signal sent on the beam is less than a preset threshold and then it is determined that the channel in the beam is idle.

Optionally, for the condition 1, i.e., the condition that the N pieces of sending time, corresponding to the N candidate beams, of the CTS signal do not overlap, the operation in 230 that the receiving node sends the CTS signal to the sending node according to the configuration information may include that: the receiving node sends the CTS signal to the sending node through the target beam within sending time, corresponding to the target beam, of the CTS signal.

Optionally, for the condition 2, i.e., the condition that the N pieces of sending time, corresponding to the N candidate beams, of the CTS signal overlap, the operation in 230 that the receiving node sends the CTS signal to the sending node according to the configuration information may include that:

the receiving node sends the CTS signal to the sending node through the target beam within the overlapping sending time of the CTS signal.

In 240, the sending node receives the CTS signal from the receiving node, the the CTS signal being sent by the receiving node according to the configuration information.

For the condition 1, the operation that the sending node receives the CTS signal sent by the receiving node according to the configuration information optionally may include that: the sending node sequentially detects the CTS signal on the N candidate beams corresponding to the N pieces of sending time of the CTS signal according to a sequence of the N pieces of sending time of the CTS signal until the CTS signal is found or until the CTS signal is found before end of last sending time of the CTS signal among the N pieces of sending time of the CTS signal.

For the condition 2, the operation that the sending node receives the CTS signal sent by the receiving node according to the configuration information optionally may include that: the sending node detects the CTS signal on the N candidate beams within the overlapping sending time of the CTS signal.

It is to be understood that, in various embodiments of the disclosure, a magnitude of a sequence number of each process does not mean an execution sequence. The execution sequence of each process should be determined by its function and an internal logic and should not form any limit to an implementation process of the embodiments of the disclosure.

The signal transmission method according to the embodiments of the disclosure is described above in detail. A device according to the embodiments of the disclosure will be described below in combination with FIG. 5 to FIG. 8. The technical characteristics described in the method embodiments are applicable to the following device embodiments.

Figure 5:
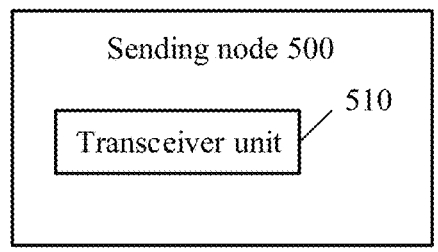
FIG. 5 is a schematic block diagram of a sending node according to an embodiment of the disclosure.

FIG. 5 is a schematic block diagram of a sending node 500 according to an embodiment of the disclosure. As shown in FIG. 5, the sending node 500 includes a transceiver unit 510, configured to:

send an RTS signal to a receiving node, the RTS signal including configuration information configured to transmit a CTS signal, and receive the CTS signal sent by the receiving node according to the configuration information.

Accordingly, the sending node, when sending the RTS signal to the receiving node, may carry the configuration information for transmission of the CTS signal to enable the receiving node to send the CTS signal to the sending node based on the configuration information, and the sending node may detect the CTS signal based on the configuration information, so that efficiency of signal transmission between the sending node and the receiving node is improved.

Optionally, the RTS signal may be at least configured to request for data transmission between the sending node and the receiving node, and the CTS signal is at least configured to indicate permission of the data transmission between the sending node and the receiving node.

Optionally, the configuration information may include indication information of each of N candidate beams and/or information of sending time, corresponding to each of the N candidate beams, of the CTS signal.

Optionally, the indication information of each of the N candidate beams may include a signal index of a reference signal having a QCL relationship with each candidate beam.

Optionally, the sending time, corresponding to each of the N candidate beams, of the CTS signal may include time occupied when the CTS signal is hypothesized to be sent through each of the N candidate beams.

Optionally, the N pieces of sending time, corresponding to the N candidate beams, of the CTS signal do not overlap; a time interval between sending time, corresponding to a first candidate beam, of the CTS signal and sending time of the RTS signal is T1; a time interval between sending time, corresponding to an ith candidate beam, of the CTS signal and sending time, corresponding to an (i+1)th candidate beam, of the CTS signal is T1; and a time interval between sending time, corresponding to an (i+1)th candidate beam, of the CTS signal and sending time, corresponding to an (i+2)th candidate beam, of the CTS signal is $T_{i+1}$, $T_i = T_{i+1}$ or $T_i \neq T_{i+1}$ and i being 1 to N−2.

Optionally, the transceiver unit 510 is specifically configured to sequentially detect the CTS signal on the N candidate beams corresponding to the N pieces of sending time of the CTS signal according to a sequence of the N pieces of sending time of the CTS signal until the CTS signal is found or until the CTS signal is found before end of last sending time of the CTS signal among the N pieces of sending time of the CTS signal.

Optionally, the N pieces of sending time, corresponding to the N candidate beams, of the CTS signal may overlap, and a time interval between the overlapping sending time of the CTS signal and the sending time of the RTS signal is T1.

Optionally, the transceiver unit 510 is specifically configured to simultaneously detect the CTS signal on the N candidate beams within the overlapping sending time of the CTS signal.

It is to be understood that the sending node 500 may execute corresponding operations executed by the sending node in the method 200 and, for simplicity, will not be elaborated herein.

Figure 6:
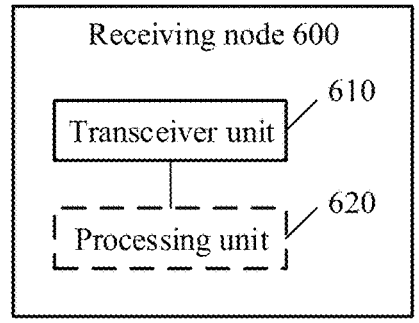
FIG. 6 is a schematic block diagram of a receiving node according to an embodiment of the disclosure.

FIG. 6 is a schematic block diagram of a receiving node 600 according to an embodiment of the disclosure. As shown in FIG. 6, the receiving node 600 includes a transceiver unit 610, configured to:

receive an RTS signal from a sending node, the RTS signal including configuration information configured to transmit a CTS signal, and send the CTS signal to the sending node according to the configuration information.

Accordingly, the sending node, when sending the RTS signal to the receiving node, may carry the configuration information for transmission of the CTS signal to enable the receiving node to send the CTS signal to the sending node based on the configuration information, and the sending node may detect the CTS signal based on the configuration information, so that efficiency of signal transmission between the sending node and the receiving node is improved.

Optionally, the RTS signal may be at least configured to request for data transmission between the sending node and the receiving node, and the CTS signal may be at least configured to indicate permission of the data transmission between the sending node and the receiving node.

Optionally, the configuration information may include indication information of each of N candidate beams and/or information of sending time, corresponding to each of the N candidate beams, of the CTS signal, N being a positive integer.

Optionally, the indication information of each of the N candidate beams may include a signal index of a reference signal having a QCL relationship with each candidate beam.

Optionally, the sending time, corresponding to each of the N candidate beams, of the CTS signal may include time occupied when the CTS signal is hypothesized to be sent through each of the N candidate beams.

Optionally, the receiving node may further include a processing unit 620, configured to select a target beam from the N candidate beams according to a measurement result obtained by performing signal measurement on a reference signal and/or a sensing result obtained by performing carrier sensing on the N candidate beams.

The transceiver unit 610 is specifically configured to send the CTS signal to the sending node through the target beam.

Optionally, the target beam may be a beam with a channel sensed to be idle among the N candidate beams, or a beam with an optimal reference signal measurement result among the N candidate beams, or a beam with an optimal reference signal measurement result among beams with channels sensed to be idle.

Optionally, the N pieces of sending time, corresponding to the N candidate beams, of the CTS signal do not overlap; a time interval between sending time, corresponding to a first candidate beam, of the CTS signal and sending time of the RTS signal is T1; a time interval between sending time, corresponding to an ith candidate beam, of the CTS signal and sending time, corresponding to an (i+1)th candidate beam, of the CTS signal is T1; and a time interval between sending time, corresponding to an (i+1)th candidate beam, of the CTS signal and sending time, corresponding to an (i+2)th candidate beam, of the CTS signal is $T_{i+1}$, $T_i=T_{i+1}$ or $T_i \neq T_{i+1}$ and i being 1 to N−2.

Optionally, the transceiver unit 610 is specifically configured to send the CTS signal to the sending node through the target beam within sending time, corresponding to the target beam, of the CTS signal.

Optionally, the N pieces of sending time, corresponding to the N candidate beams, of the CTS signal may overlap, and a time interval between the overlapping sending time of the CTS signal and the sending time of the RTS signal is T1.

Optionally, the transceiver unit 610 is specifically configured to send the CTS signal to the sending node through the target beam within the overlapping sending time of the CTS signal.

It is to be understood that the receiving node 600 may execute corresponding operations executed by the receiving node in the method 200 and, for simplicity, will not be elaborated herein.

Figure 7:
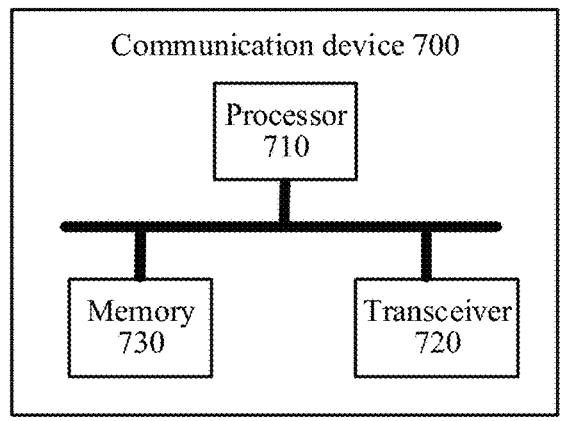
FIG. 7 is a schematic structure diagram of a communication device according to an embodiment of the disclosure.

FIG. 7 is a schematic structure diagram of a communication device 700 according to an embodiment of the disclosure. As shown in FIG. 7, the communication device includes a processor 710, a transceiver 720 and a memory 730. Herein, the processor 710, the transceiver 720 and the memory 730 can communicate with one another through an internal connecting path. The memory 730 is configured to store instructions, and the processor 710 is configured to execute the instructions stored in the memory 730 to control the transceiver 720 to receive a signal or send a signal.

Optionally, the processor 710 may call the program codes stored in the memory 730 to execute corresponding operations executed by the sending node in the method 200. For similarity, elaborations are omitted herein.

Optionally, the processor 710 may call the program codes stored in the memory 730 to execute corresponding operations executed by the receiving node in the method 200. For similarity, elaborations are omitted herein.

It is to be understood that the processor in the embodiments of the disclosure may be an integrated circuit chip and has a signal processing capability. In an implementation process, each operation of the method embodiment may be completed by an integrated logical circuit of hardware in the processor or instructions in a software form. The processor may be a universal processor, a Digital Signal Processor (DSP), an Disclosure Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 8:
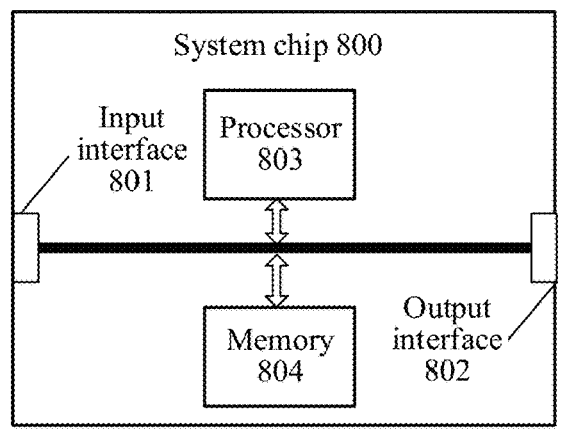
FIG. 8 is a schematic structure diagram of a system chip according to an embodiment of the disclosure.

FIG. 8 is a schematic structure diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 can be connected with one another through an internal connecting path. The processor 803 is configured to execute codes in the memory 804.

Optionally, when the codes are executed, the processor 803 may implement corresponding operations executed by the sending node in the method 200. For simplicity, elaborations are omitted herein.

Optionally, when the codes are executed, the processor 803 may implement corresponding operations executed by the receiving node in the method 200. For simplicity, elaborations are omitted herein.

It is to be understood that, in the embodiments of disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may be or may not be physically separated, and parts displayed as units may be or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a monitoring unit, each unit may also physically exist independently, and two or more than two units may also be integrated into a unit.

When being realized in form of software functional units and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for signal transmission, comprising:
    sending, by a sending node, a request-to-send (RTS) signal to a receiving node, the RTS signal comprising configuration information configured to transmit a clear-to-send (CTS) signal; and
    receiving, by the sending node, the CTS signal from the receiving node, the CTS signal being sent by the receiving node according to the configuration information,
    wherein the configuration information comprises at least one of:
        indication information of each of N candidate beams; or
        information of sending time, corresponding to each of the N candidate beams, of the CTS signal,
        N being a positive integer,
        wherein the indication information of each of the N candidate beams comprises a signal index of a reference signal having a quasi-co-located (QCL) relationship with each of the N candidate beams.

2. The method of claim 1, wherein the RTS signal is at least configured to request for data transmission between the sending node and the receiving node, and the CTS signal is at least configured to indicate permission of the data transmission between the sending node and the receiving node.

3. The method of claim 1, wherein the sending time, corresponding to each of the N candidate beams, of the CTS signal comprises time occupied when the CTS signal is hypothesized to be sent through each of the N candidate beams.

4. The method of claim 1, wherein N pieces of sending time, corresponding to the N candidate beams, of the CTS signal do not overlap;
    a time interval between sending time, corresponding to a first candidate beam, of the CTS signal and sending time of the RTS signal is T1;
    a time interval between sending time, corresponding to an ith candidate beam, of the CTS signal and sending time, corresponding to an (i+1)th candidate beam, of the CTS signal is $T_i$; and
    a time interval between sending time, corresponding to an (i+1)th candidate beam, of the CTS signal and sending time, corresponding to an (i+2)th candidate beam, of the CTS signal is $T_{i+1}$, $T_i = T_{i+1}$ or $T_i \neq T_{i+1}$, i being 1 to N−2.

5. The method of claim 4, wherein receiving, by the sending node, the CTS signal from the receiving node, the CTS signal being sent by the receiving node according to the configuration information comprises:
    sequentially detecting, by the sending node, the CTS signal on the N candidate beams corresponding to the N pieces of sending time of the CTS signal according to a sequence of the N pieces of sending time of the CTS signal until the CTS signal is found or until the CTS signal is found before end of last sending time of the CTS signal among the N pieces of sending time of the CTS signal.

6. A method for signal transmission, comprising:
    receiving, by a receiving node, a request-to-send (RTS) signal from a sending node, the RTS signal comprising configuration information configured to transmit a clear-to-send (CTS) signal; and
    sending, by the receiving node, the CTS signal to the sending node according to the configuration information,
    wherein the configuration information comprises at least one of:
        indication information of each of N candidate beams; or
        information of sending time, corresponding to each of the N candidate beams, of the CTS signal, N being a positive integer, wherein the indication information of each of the N candidate beams comprises a signal index of a reference signal having a quasi-co-located (QCL) relationship with each of the N candidate beams.

7. The method of claim 6, before sending, by the receiving node, the CTS signal to the sending node, the method further comprising:

selecting, by the receiving node, a target beam from the N candidate beams according to at least one of the following: a measurement result obtained by performing signal measurement on a reference signal; or, a sensing result obtained by performing carrier sensing on the N candidate beams, wherein sending, by the receiving node, the CTS signal to the sending node comprises:

sending, by the receiving node, the CTS signal to the sending node through the target beam.

8. The method of claim 6, wherein N pieces of sending time, corresponding to the N candidate beams, of the CTS signal do not overlap;

a time interval between sending time, corresponding to a first candidate beam, of the CTS signal and sending time of the RTS signal is T1;

a time interval between sending time, corresponding to an ith candidate beam, of the CTS signal and sending time, corresponding to an (i+1)th candidate beam, of the CTS signal is $T_i$; and a time interval between sending time, corresponding to an (i+1)th candidate beam, of the CTS signal and sending time, corresponding to an (i+2)th candidate beam, of the CTS signal is $T_{i+1}$, $T_i = T_{i+1}$ or $T_i \ne T_{i+1}$, $i$ being 1 to $N-2$.

9. The method of claim 8, wherein sending, by the receiving node, the CTS signal to the sending node according to the configuration information comprises:

sending, by the receiving node, the CTS signal to the sending node through the target beam within sending time, corresponding to the target beam, of the CTS signal.

10. A sending node, comprising:

a processor; and a transceiver, connected to the processor and configured to send and receive information under control of the processor, wherein the transceiver is specifically configured to:

send a request-to-send (RTS) signal to a receiving node, the RTS signal comprising configuration information configured to transmit a clear-to-send (CTS) signal, and further configured to receive the CTS signal from the receiving node, the CTS signal being sent by the receiving node according to the configuration information, wherein the configuration information comprises at least one of:

indication information of each of N candidate beams; or information of sending time, corresponding to each of the N candidate beams, of the CTS signal, N being a positive integer, wherein the indication information of each of the N candidate beams comprises a signal index of a reference signal having a quasi-co-located (QCL) relationship with each of the N candidate beams.

11. The sending node of claim 10, wherein N pieces of sending time, corresponding to the N candidate beams, of the CTS signal overlap, and a time interval between the overlapping sending time of the CTS signal and sending time of the RTS signal is T1.

12. The sending node of claim 11, wherein the transceiver is specifically configured to:

detect the CTS signal on the N candidate beams within the overlapping sending time of the CTS signal.

13. A receiving node, comprising:

a processor; and a transceiver, connected to the processor and configured to send and receive information under control of the processor, wherein the transceiver is specifically configured to:

receive a request-to-send (RTS) signal from a sending node, the RTS signal comprising configuration information configured to transmit a clear-to-send (CTS) signal, and further configured to send the CTS signal to the sending node according to the configuration information, wherein the configuration information comprises at least one of:

indication information of each of N candidate beams; or information of sending time, corresponding to each of the N candidate beams, of the CTS signal, N being a positive integer, wherein the indication information of each of the N candidate beams comprises a signal index of a reference signal having a quasi-co-located (QCL) relationship with each of the N candidate beams.

14. The receiving node of claim 13, wherein N pieces of sending time, corresponding to the N candidate beams, of the CTS signal overlap, and a time interval between the overlapping sending time of the CTS signal and sending time of the RTS signal is T1.

15. The receiving node of claim 14, wherein the transceiver is specifically configured to:

send the CTS signal to the sending node through the target beam within the overlapping sending time of the CTS signal.

* * * * *